Figure 1:
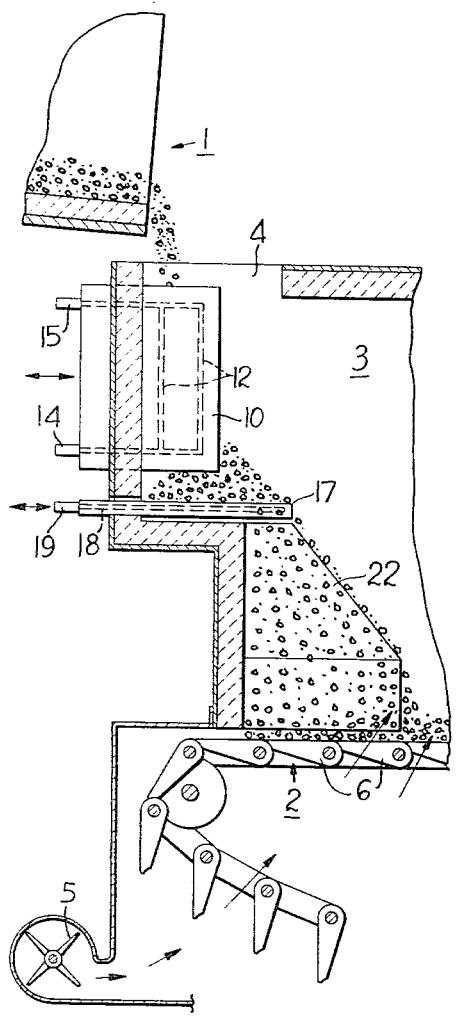

Feb. 1, 1966    H. W. WINTER    3,232,416

DISTRIBUTOR FOR CONVEYOR

Filed Nov. 29, 1963

Inventor
Heinz W. Winter
By Arthur M. Streich
Attorney

United States Patent Office 3,232,416
Patented Feb. 1, 1966

3,232,416
DISTRIBUTOR FOR CONVEYOR
Heinz W. Winter, Wauwatosa, Wis., assignor to Allis-Chalmers Manufacturing Company, Milwaukee, Wis.
Filed Nov. 29, 1963, Ser. No. 326,932
9 Claims. (Cl. 198—43)

This invention relates to systems for treating loose material with a fluid and may be applied with particular advantage to coolers for Portland cement clinker discharged from rotary kilns.

It is well-known that the effectiveness of a traveling grate type conveyer cooler depends to a substantial degree upon achieving uniform gas permeability of the material on the grate. This permeability in turn depends upon the degree to which the hot material is evenly distributed across the entire width of the conveyer without segregation of different size material particles. Conical shaped material distribution slides have been used to distribute material because such a surface is made up of a great number of straight lines originating at a common point (the apex of the cone) and spreading out in a downwardly direction. Since each such straight line offers a path for particles rolling down the cone there is great potential for achieving even distribution with such a slide. This potential is difficult to even approach, however, because ideally all material should fall upon the apex of the cone. Since it is impossible to cause a substantial quantity of material to land upon a single point, it becomes necessary to drop at least some of the material on the cone below the apex. Then the degree of even distribution achieved at the base of the cone obviously depends upon the degree of even distribution around the top of the cone at a level somewhat below the apex. It is the solving of this problem of achieving the desired distribution of material at a level below the apex of a conical surface, in order to achieve the full potential of a conical distributor, that is the primary object of the present invention.

Another object of the present invention is to provide for improved distribution of material across the entire width of a conveyer with provision for adjustment of the distribution pattern and while the apparatus remains in operation.

Still other objects of the present invention include providing for the cooling of those parts of a material distribution assembly that are exposed to the most severe temperatures and providing for easy removal and replacement of such parts when necessary.

According to the present invention a distributor is provided having a surface configuration of a vertical half of a frustrum of a right circular cone. Material is funneled onto a flat horizontal plate just above the distributor. Material falling upon this plate builds up a small cone shaped pile on the plate. The pile grows higher until the angle of repose is exceeded and after that material tumbles and rolls down the pile and spills evenly over the edge of the plate and falls in the desired pattern upon the sloping surface of the distributor. A pair of sloping wall plates may define an open bottom trough for funneling material onto the horizontal plate. The wall plates and the impact plate may each be movable to adjust the position of the pile of material on the horizontal plate and to adjust the location where material spills over the plate and strikes the distributor. These plates may also be completely withdrawn and replaced when necessary. These plates may also be water cooled to prolong their useful life and this will be highly desirable for such as cement clinker coolers in which very high temperature clinker falls upon those parts immediately upon emerging from the kiln.

Figure 2:
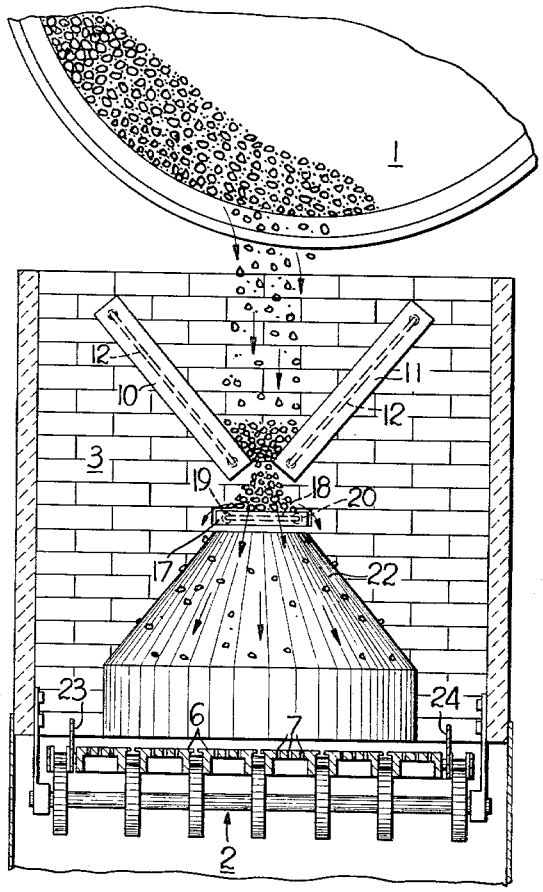

Other objects and how they are attained will appear as the description of the invention proceeds with reference to the drawings, in which:

FIG. 1 is a fragmentary and sectional side elevation view of an embodiment of the present invention as it may be applied to receive a hot granular material discharged from a rotary kiln to spread this material upon a traveling grate type cooler conveyer; and FIG. 2 is an end view of the structure as is shown in FIG. 1.

Referring to the drawings and FIG. 1 in particular, reference number 1 indicates the discharge end of a conventional rotary kiln such as may be used for burning Portland cement clinker. Hot clinker discharged from kiln 1 is deposited on a charge end of a conveyer 2 upon which the material is cooled while traveling to a discharge end of the conveyer (not shown). The conveyer 2 is enclosed by a housing 3 which defines an opening 4 over the charge end of conveyer 2. A fan 5 is connected to the bottom of housing 3 to blow cool air into housing 3 to pass upward as indicated by arrows in FIG. 1. Conveyer 2 is provided with grate segments 6 each having openings 7 (see FIG. 2) of such size and number that cooling air may readily pass upwardly with but a minimum of fines falling downwardly through the openings.

An assemblage of means is provided and supported by housing 3, internally thereof, for collecting the material dropped through opening 4 and distributing such material evenly across the entire width of the top of conveyer 2. This assemblage includes collector means shown as comprising a pair of wall plates 10 and 11 arranged (see FIG. 2) to form an open bottom V-shaped trough. Plates 10 and 11 are provided with internal passages 12 for circulating cooling water therethrough and each plate is provided with water inlet and outlet connections 14 and 15 as shown in FIG. 1. Plates 10 and 11 are movably supported by housing 3 to be movable as indicated by arrows in FIG. 1 and easily replaceable.

A flat generally horizontal impact plate 17 is arranged beneath the opening defined between plates 10 and 11. Plate 17, like plates 10, 11, may be provided with internal passages 18 for circulating cooling water therethrough, with inlet and outlet connections 19, 20. Plate 17 may also be movably supported by housing 3 for movement such as indicated by arrows in FIG. 1 and also replacement thereof.

A distributor 22, supported by housing 3, is arranged in spaced relation over conveyer 2 and beneath impact plate 17. Distributor 22 is provided with a surface configuration of a vertical half-frustrum of a right circular cone. The distributor 22 is arranged with its surface diverging downwardly toward the discharge end and sides 23, 24 (see FIG. 2) of the conveyer 2.

In the operation of the described apparatus, hot material discharged from kiln 1 is dropped through opening 4 and into the trough defined by wall plates 10, 11. The material is then funneled on to impact plate 17 where it builds up a small cone shaped pile of the material. The pile of material on plate 17 grows higher until the sides of this pile define an acute angle with plates 17 that exceeds the angle of repose for the material. Thereafter material will roll down this conical shaped pile and spill over the edge of plate 17 and shower down upon distributor 22 in the desired pattern of evenly distributed particles across the distribution surface, to then spread evenly across the entire width of conveyor 2. The position of the pile of material on plate 17 can be adjusted by adjusting the position of walls 10, 11 and the curtain of material showering over the edge of plate 17 can be adjusted by adjusting the position of the plate itself.

Thus, it has been shown that the present invention, by its unique features, accomplishes the objects stated therefor and others that will occur to those skilled in the art.

Modifications and equivalents of the disclosed features such as readily occur to those skilled in the art are intended to be included within the scope of this invention and therefore the scope of this invention is intended to be limited only by the scope of the claims such as are, or may hereafter be, appended hereto.

The embodiments of the invention in which an exclusive property or privilege is claimed are defined as follows:

1. In a system for treating loose material, a material conveyer having a charge end and a discharge end, a housing enclosing a space over said conveyer and defining an opening over said conveyer near said charge end, and an assemblage supported by said housing and internally thereof for collecting material dropped through said opening and distributing it evenly across said conveyer, said collecting and distributing means comprising a distributor having a surface configuration of a vertical half-frustrum of a right circular cone, said distributor being arranged with said surface diverging downwardly toward said discharge end and sides of said conveyer and spaced a predetermined distance over said conveyer, and adjustable collector means supported for movements in a horizontal path above the top surface of said half-frustrum cone for collecting material dropped through said opening and directing an adjustable shower of said material upon said half-frustrum conical surface.

2. In a system for treating loose material, a material conveyer having a charge end and a discharge end, a housing enclosing a space over said conveyer and defining an opening over said conveyer near said charge end, and means supported by said housing and internally thereof for collecting material dropped through said opening and distributing it evenly across said conveyer, said collecting and distributing means comprising a distributor having a surface configuration of a vertical half-frustrum of a right circular cone, said distributor being arranged with said surface diverging downwardly toward said discharge end and sides of said conveyer and spaced a predetermined distance over said conveyer, and an impact plate having a semicircular leading edge arranged over said distributor surface for collecting material dropped through said opening and directing over said leading edge a shower of said material to fall evenly upon and across said distributor surface.

3. In a system for treating loose material, a material conveyer having a charge end and a discharge end, a housing enclosing a space over said conveyer and defining an opening over said conveyer near said charge end, and means supported by said housing and internally thereof for collecting material dropped through said opening and distributing it evenly across said conveyer, said collecting and distributing means comprising a distributor having a surface configuration of a vertical half-frustrum of a right circular cone, said distributor being arranged with said surface diverging downwardly toward said discharge end and sides of said conveyer and spaced a predetermined distance over said conveyer, and an impact plate having a semicircular leading edge arranged over said distributor and movable relative to said distributor for collecting material dropped through said opening and directing over said leading edge an adjustably directed shower of said material upon said distributor surface.

4. In a system for treating loose material, a material conveyer having a charge end and a discharge end, a housing enclosing a space over said conveyer and defining an opening over said conveyer near said charge end, and means supported by said housing and internally thereof for collecting material dropped through said opening and distributing it evenly across said conveyer, said collecting and distributing means comprising a distributor having a surface configuration of a vertical half-frustrum of a right circular cone, said distributor being arranged with said surface diverging downwardly toward said discharge end and sides of said conveyer and spaced a predetermined distance over said conveyer, an impact plate having a semicircular leading edge arranged over said distributor and movable relative to said distributor, said plate defining therewithin internal fluid circulating cooling passages.

5. In a system for treating loose material, a material conveyer having a charge end and a discharge end, a housing enclosing a space over said conveyer and defining an opening over said conveyer near said charge end, and means supported by said housing and internally thereof for collecting material dropped through said opening and distributing it evenly across said conveyer, said collecting and distributing means comprising a distributor having a surface configuration of a vertical half-frustrum of a right circular cone, said distributor being arranged with said surface diverging downwardly toward said discharge end and sides of said conveyer and spaced a predetermined distance over said conveyer, an impact plate having a semicircular leading edge arranged over said distributor, and a pair of trough wall plates arranged over said impact plate and forming an open bottom V-shaped trough.

6. In a system for treating loose material, a material conveyer having a charge end and a discharge end, a housing enclosing a space over said conveyer and defining an opening over said conveyer near said charge end, and means supported by said housing and internally thereof for collecting material dropped through said opening and distributing it evenly across said conveyer, said collecting and distributing means comprising a distributor having a surface configuration of a vertical half-frustrum of a right circular cone, said distributor being arranged with said surface diverging downwardly toward said discharge end and sides of said conveyer and spaced a predetermined distance over said conveyer, an impact plate having a semicircular leading edge arranged over said distributor, and a pair of movable trough wall plates arranged over said impact plate and forming an open bottom V-shaped trough movable over said impact plate.

7. In a system for treating loose material, a material conveyer having a charge end and a discharge end, a housing enclosing a space over said conveyer and defining an opening over said conveyer near said charge end, and means supported by said housing and internally thereof for collecting material dropped through said opening and distributing it evenly across said conveyer, said collecting and distributing means comprising a distributor having a surface configuration of a vertical half-frustrum of a right circular cone, said distributor being arranged with said surface diverging downwardly toward said discharge end and sides of said conveyer and spaced a predetermined distance over said conveyer, an impact plate having a semicircular leading edge arranged over said distributor, a pair of movable trough wall plates arranged over said impact plate and forming an open bottom V-shaped trough movable over said impact plate, and each of said trough wall plates defining therewithin internal fluid circulating cooling passages.

8. In a system for treating loose material, a material conveyer having a charge end and a discharge end, a housing enclosing a space over said conveyer and defining an opening over said conveyer near said charge end, and means supported by said housing and internally thereof for collecting material dropped through said opening and distributing it evenly across said conveyer, said collecting distributing means comprising a distributor having a surface configuration of a vertical half-frustrum of a right circular cone, said distributor being arranged with said surface diverging downwardly toward said discharge end and sides of said conveyer and spaced a predetermined distance over said conveyer, an impact plate having a semicircular leading edge arranged over said distributor and movable relative to said conveyer, a pair of movable trough wall plates arranged over said impact plate and forming an open bottom V-shaped trough movable over said impact plate, and each of said trough wall plates defining therewithin internal fluid circulating cooling passages.

9. In a system for treating loose material, a material conveyer having a charge end and a discharge end, a housing enclosing a space over said conveyer and defining an opening over said conveyer near said charge end, and means supported by said housing and internally thereof for collecting material dropped through said opening and distributing it evenly across said conveyer, said collecting and distributing means comprising a distributor having a surface configuration of a vertical half-frustrum of a right circular cone, said distributor being arranged with said surface diverging downwardly toward said discharge end and sides of said conveyer and spaced a predetermined distance over said conveyer, an impact plate having a semicircular leading edge arranged over said distributor and movable relative to said distributor, a pair of movable trough wall plates arranged over said impact plate and forming an open bottom V-shaped trough movable over said impact plate, and each of said trough wall plates and said impact plate defining therewithin internal fluid circulating cooling passages.

References Cited by the Examiner
UNITED STATES PATENTS

| | | | |
|---|---|---|---|
| 1,813,590 | 7/1931 | Stock | 193—2 |
| 1,869,628 | 8/1932 | Stock | 193—2 |
| 1,882,864 | 10/1932 | Nickerson | 193—2 |
| 3,062,355 | 11/1962 | Sawada | 198—37 |

SAMUEL F. COLEMAN, *Primary Examiner.*